(12) United States Patent
Li

(10) Patent No.: US 10,527,145 B2
(45) Date of Patent: Jan. 7, 2020

(54) TORQUE CONVERTER ASSEMBLY AND A VEHICLE INCLUDING THE TORQUE CONVERTER ASSEMBLY

(71) Applicant: GM GLOBAL TECHNOLOGY OPERATIONS LLC, Detroit, MI (US)

(72) Inventor: Dongxu Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 345 days.

(21) Appl. No.: 15/404,874

(22) Filed: Jan. 12, 2017

(65) Prior Publication Data

US 2018/0195594 A1    Jul. 12, 2018

(51) Int. Cl.
 *F16H 45/02*    (2006.01)
(52) U.S. Cl.
 CPC ..... *F16H 45/02* (2013.01); *F16H 2045/0252* (2013.01); *F16H 2045/0284* (2013.01)
(58) Field of Classification Search
 CPC ............. F16H 45/02; F16H 2045/0252; F16H 2045/0284; F16D 13/40; F16D 13/52
 See application file for complete search history.

(56) References Cited

U.S. PATENT DOCUMENTS

| 5,762,172 A  * | 6/1998 | Tsukamoto | ............. F16H 45/02 |
| | | | 192/212 |
| 2007/0007095 A1* | 1/2007 | Tsukamoto | ......... F16D 25/0638 |
| | | | 192/3.29 |

* cited by examiner

*Primary Examiner* — Huan Le
(74) *Attorney, Agent, or Firm* — Quinn IP Law

(57) ABSTRACT

A torque converter assembly includes a pump and a turbine fluidly connected to the pump. The torque converter assembly also includes a damper operable upstream from the turbine. The damper is configured to reduce oscillation from the pump toward the turbine. The torque converter assembly further includes a clutch operable between the pump and the turbine. The clutch is operable in a slip condition in which the clutch is adjustable to allow the pump and the turbine to slip relative to each other to control oscillation through the clutch to the turbine. The damper is operable upstream from the clutch such that oscillation from the pump is reduced by the damper before oscillation reaches the clutch. Additionally, a vehicle includes the torque converter assembly operable between an output shaft of an engine and an input member of a transmission.

15 Claims, 2 Drawing Sheets

TORQUE CONVERTER ASSEMBLY AND A VEHICLE INCLUDING THE TORQUE CONVERTER ASSEMBLY

INTRODUCTION

A vehicle can include an engine and a transmission coupled to the engine. Generally, the transmission is coupled to the engine to receive torque outputted from the engine. The vehicle can include a torque converter connected to an output shaft of the engine and an input member of the transmission. The torque converter can provide the desired multiplication of torque from the engine into the transmission.

SUMMARY

The present disclosure provides a torque converter assembly including a pump and a turbine fluidly connected to the pump. The torque converter assembly also includes a damper operable upstream from the turbine. The damper is configured to reduce oscillation from the pump toward the turbine. The torque converter assembly further includes a clutch operable between the pump and the turbine. The clutch is operable in a slip condition in which the clutch is adjustable to allow the pump and the turbine to slip relative to each other to control oscillation through the clutch to the turbine. The damper is operable upstream from the clutch such that oscillation from the pump is reduced by the damper before oscillation reaches the clutch.

The present disclosure also provides a vehicle including an engine and a transmission. The engine includes an output shaft and the transmission includes an input member. The vehicle includes a torque converter assembly operable between the output shaft and the input member. The torque converter assembly includes the components discussed in the paragraph immediately above.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims.

Figure 1:
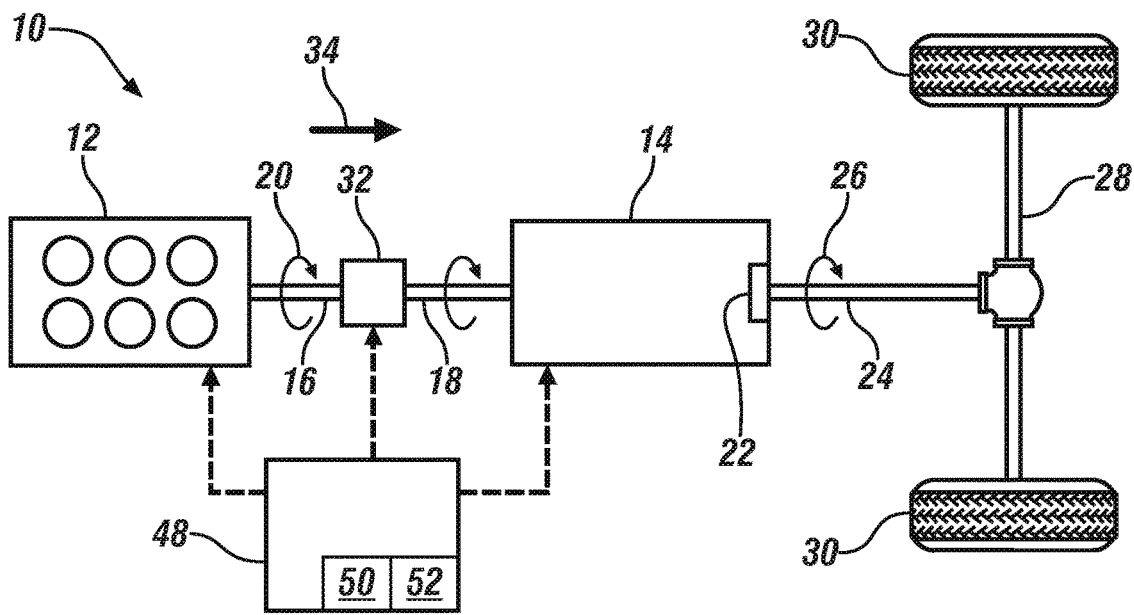
FIG. 1 is a schematic illustration of a vehicle including a torque converter assembly.

Referring to the Figures, wherein like numerals indicate like or corresponding parts throughout the several views, a vehicle 10 is generally shown in FIG. 1. Non-limiting examples of the vehicle 10 can include cars, trucks, all-terrain vehicles, off-road vehicles, recreational vehicles, aircrafts, boats, watercrafts, farm equipment or any other suitable movable platform.

Continuing with FIG. 1, the vehicle 10 can include an engine 12 and a transmission 14 coupled to the engine 12. Generally, the transmission 14 is coupled to the engine 12 to receive torque outputted from the engine 12. The engine 12 can be an internal combustion engine or any other suitable type of engine. The engine 12 can include an output shaft 16, and the transmission 14 can include an input member 18. The output shaft 16 of the engine 12 rotates at an engine speed (see arrow 20), and torque from rotation of the output shaft 16 is transferred to the input member 18 of the transmission 14, which causes the input member 18 to rotate. The powertrain of the vehicle 10 can include one or more electric traction motors in an optional hybrid embodiment to provide additional sources of input torque. Non-limiting examples of the transmission 14 can include automatic transmission, dual clutch transmission, automated manual transmission, continuously variable transmission (CVT), etc.

Again continuing with FIG. 1, the transmission 14 can include a final drive 22 surrounding the input member 18 and an output member 24 that delivers output torque (see arrow 26) to one or more drive axles 28 through the final drive 22, and ultimately to a set of wheels 30. Therefore, torque from the engine 12 is transferred to the transmission 14 and the transmission 14 outputs torque to drive the wheels 30. It is to be appreciated that the final drive 22 can be driven by an endless rotatable member, and non-limiting examples of the endless rotatable member can include a belt or a chain.

Figure 2:
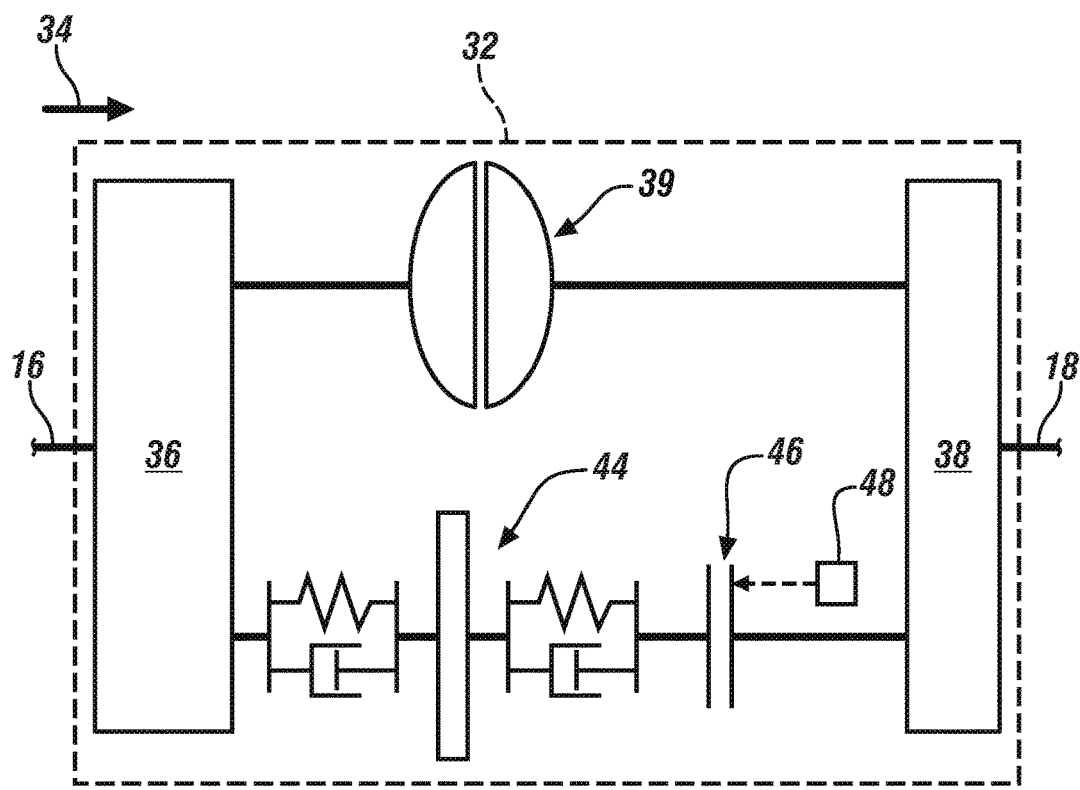
FIG. 2 is a schematic illustration of the torque converter assembly.
Figure 3:
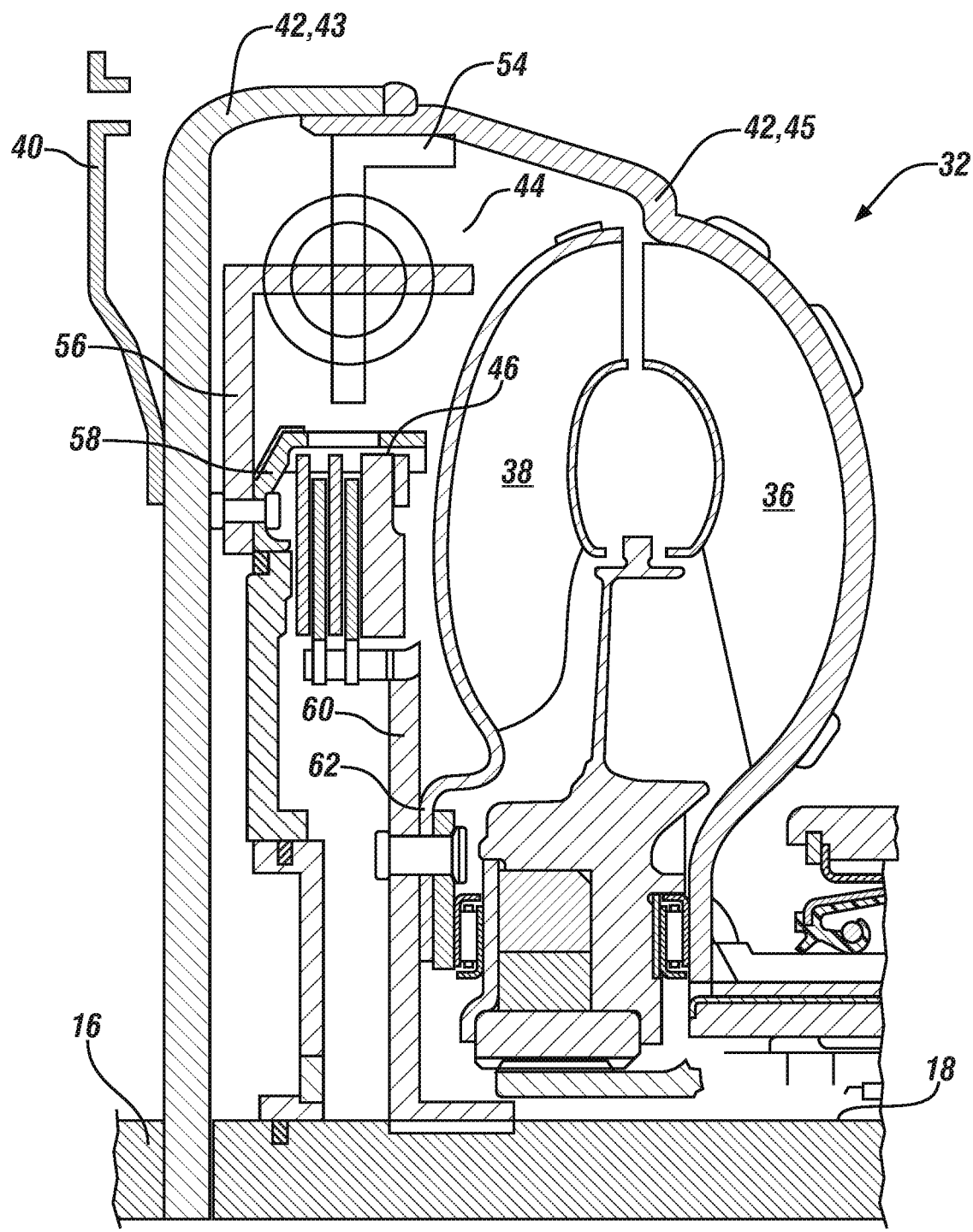
FIG. 3 is a schematic fragmentary illustration of the torque converter assembly.

Referring to FIGS. 1-3, a torque converter assembly 32 can be utilized. In certain embodiments, the vehicle 10 can include the torque converter assembly 32 described herein. In the vehicle application, the torque converter assembly 32 is operable between the output shaft 16 and the input member 18. For example, the torque converter assembly 32 can be connected to the output shaft 16 of the engine 12 and the input member 18 of the transmission 14. As such, the output shaft 16 of the engine 12 is rotatable to transfer torque in a direction to the input member 18 of the transmission 14 through the torque converter assembly 32. Therefore, the direction that torque is transferred is illustrated by arrow 34 (see FIGS. 1 and 2). The torque converter assembly 32 can provide the desired multiplication of torque from the engine 12 into the transmission 14 at low speeds.

Operation of the engine 12 creates oscillations, which is transferred through the output shaft 16 to the torque converter assembly 32. For example, as the engine 12 operates, vibrations are created by the moving parts. As such, operation of the engine 12 outputs torque, which creates oscillations in the output shaft 16. The torque converter assembly 32, as detailed below, reduces an amount of oscillation being outputted therefrom. As such, in certain embodiments, the torque converter assembly 32 also reduces the amount of oscillation transferred to the transmission 14 from the engine 12.

Referring to FIGS. 2 and 3, the torque converter assembly 32 includes a pump 36 and a turbine 38 fluidly connected to the pump 36. Hence, the pump 36 and the turbine 38 are operable through a fluid coupling 39, in which fluid that moves through the pump 36, due to rotation of the pump 36, is transferred to the turbine 38 which causes rotation of the turbine 38. Generally, in the vehicle application, the pump 36 is coupled to the output shaft 16 of the engine 12 and the turbine 38 is coupled to the input member 18 of the transmission 14. Furthermore, the pump 36 and the turbine 38 are each rotatable. The pump 36 and the turbine 38 can be rotatable concurrently or independently of each other. A fluid is transferred from the pump 36 to the turbine 38, and back again, in a loop during rotation of the pump 36 and the turbine 38. The fluid can be a liquid fluid, and non-limiting examples of the liquid fluid can include transmission fluid, oil, synthetic oil, etc.

The engine 12 can include a plate 40 (see FIG. 3) fixed to the output shaft 16 (of the engine 12). The plate 40 can be directly or indirectly fixed to the output shaft 16. Therefore, the plate 40 and the output shaft 16 are rotatable concurrently. As such, the plate 40 rotates that the same speed as that the output shaft 16. The plate 40 can be referred to as a flywheel, a drive plate or a flex plate.

Continuing with FIG. 3, the torque converter assembly 32 can include a casing 42. The casing 42 can be fixed to the plate 40 either directly or indirectly. The casing 42 can contain the pump 36 and the turbine 38. Furthermore, the casing 42 can be split into separate pieces, for example, the casing 42 can include a first casing portion 43 and a second casing portion 45 (see FIG. 3). As shown in FIG. 3, the plate 40 can be fixed to the output shaft 16 through the casing 42, and more specifically through the first casing portion 43.

The second casing portion 45 can house at least part of the pump 36. Movement of the second casing portion 45 causes movement of the pump 36. In FIG. 3, the first casing portion 43 is fixed to the plate 40 by one or more fastener, such as a bolt, a pin, etc., or welded thereto. The second casing portion 45 is fixed (either directly or indirectly) to the first casing portion 43 by one or more fastener, such as a bolt, a pin, etc., or welded thereto. The pump 36 is rotatable with the plate 40 through the casing 42. Therefore, the plate 40, the output shaft 16 and the pump 36 are rotatable concurrently. As such, the pump 36 rotates that the same speed as that the output shaft 16. Rotation of the pump 36 causes the fluid inside the pump 36 to move toward the turbine 38. Movement of the fluid into the turbine 38 from the pump 36 causes the turbine 38 to rotate. As such, the pump 36 and the turbine 38 are fluidly connected. The pump 36 is rotatable to transfer torque through the turbine 38. The turbine 38 can rotate at the same speed or a different speed from the pump 36, which is discussed further below.

Referring to FIGS. 2 and 3, the torque converter assembly 32 further includes a damper 44 operable upstream from the turbine 38. Furthermore, the damper 44 is operable in a parallel relationship relative to the fluid coupling 39 between the pump 36 and the turbine 38. As best shown in FIG. 3, the damper 44 is operable upstream from the turbine 38 relative to the direction that torque is transferred. The damper 44 is configured to reduce oscillation from the pump 36 toward the turbine 38. As such, oscillations from the engine 12 are transferred to the damper 44 through the pump 36, and the damper 44 reduces those oscillations.

Continuing with FIGS. 2 and 3, the torque converter assembly 32 also includes a clutch 46 operable between the pump 36 and the turbine 38. The clutch 46 can operate to allow slip between the pump 36 and the turbine 38, i.e., allows the turbine 38 to rotate at a different speed from the pump 36. The pump 36 and the turbine 38 rotate at different speeds when the clutch 46 is in a slip condition. The pump 36 is rotatable to transfer torque through the damper 44 and the clutch 46 to the turbine 38 when the clutch 46 is operable in the slip condition. The clutch 46 is operable in the slip condition in which the clutch 46 is adjustable to allow the pump 36 and the turbine 38 to slip relative to each other to control oscillation through the clutch 46 to the turbine 38.

Therefore, allowing slip to occur between the pump 36 and the turbine 38 also reduces the amount of oscillation transferred to the transmission 14. The damper 44 is configured to reduce oscillation from operation of the engine 12 to the input member 18 of the transmission 14 when the clutch 46 is engaged. As such, the clutch 46 and the damper 44 can both damp oscillations from the engine 12, which thus reduces the amount of oscillations being transferred to the input member 18 of the transmission 14.

The clutch 46 can be adjustable to change an amount of pressure clamping together friction plates. Therefore, depending on the desired amount of slip between the pump 36 and the turbine 38, the amount of pressure that clamps the friction plates together can be changed by a solenoid of the clutch 46 to allow the pump 36 and the turbine 38 to slip relative to each other.

A controller 48 can be in electrical communication with the torque converter assembly 32, the engine 12 and/or the transmission 14. In certain embodiments, the controller 48 is in electrical communication with the clutch 46, and more specifically, with the solenoid of the clutch 46 which operates to control the amount of pressure applied to the friction plates. Therefore, for example, the controller 48 can control the amount of slip between the pump 36 and the turbine 38. Instructions can be stored in a memory 50 of the controller 48 and automatically executed via a processor 52 of the controller 48 to provide the respective control functionality.

The controller 48 is configured to execute the instructions from the memory 50, via the processor 52. For example, the controller 48 can be a host machine or distributed system, e.g., a computer such as a digital computer or microcomputer, and, as the memory 50, tangible, non-transitory computer-readable memory such as read-only memory (ROM) or flash memory. The controller 48 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 48 can include all software, hardware, memory 50, algorithms, connections, sensors, etc., necessary to control, for example, the clutch 46. As such, a control method operative to control the clutch 46, can be embodied as software or firmware associated with the controller 48. It is to be appreciated that the controller 48 can also include any device capable of analyzing data from various sensors, comparing data, making the necessary decisions required to control and/or monitor the clutch 46, the torque converter assembly 32, the engine 12 and/or the transmission 14. Optionally, more than one controller 48 can be utilized.

The clutch 46 can also operate to lock the pump 36 and turbine 38 together, i.e., allows the pump 36 and the turbine 38 to rotate that the same speed. As such, the pump 36 and the turbine 38 rotate at the same speed when the clutch 46 is in a full lock condition. The clutch 46 is operable in the full lock condition in which the clutch 46 locks the pump 36 and the turbine 38 together through the damper 44 such that the pump 36 and the turbine 38 rotate at the same speed. In other words, the clutch 46 can operate to prevent slip between the pump 36 and the turbine 38.

The damper 44 is operable upstream from the clutch 46 such that oscillation from the pump 36 is reduced by the damper 44 before oscillation reaches the clutch 46. Therefore, the clutch 46 faces a reduced amount of oscillation (oscillation from the speed of rotation of the components) across either side of the clutch 46 while in the slip condition due to the damper 44 reducing oscillation before the clutch 46. By reducing the amount of oscillation across the clutch 46, less slip is utilized by the clutch 46 to maintain a positive net speed difference between the two sides of the clutch 46. Slip can introduce energy losses that can decrease fuel economy. When the reduced amount of oscillation reaches the clutch 46 due to the damper 44 being upstream from the clutch 46, less oscillation needs to be controlled by the clutch 46 so the amount of slip can be reduced, which reduces energy loss and improves fuel economy.

Referring to FIG. 3, the casing 42 can contain the pump 36, the turbine 38, the damper 44 and the clutch 46. As best shown in FIG. 2, the damper 44 is operable upstream from the clutch 46 and the turbine 38 relative to the direction that torque is transferred. The pump 36 is operable upstream from the damper 44, the clutch 46 and the turbine 38 relative to the direction that torque is transferred. The damper 44 is operable between the pump 36 and the clutch 46 relative to the direction that torque is transferred. The clutch 46 is operable between the damper 44 and the turbine 38 relative to the direction that torque is transferred. Therefore, simply stated, as one example, the order of the components of the torque converter assembly 32 can be the pump 36, the damper 44, the clutch 46 and the turbine 38 in the direction that torque is transferred.

Turning to FIG. 3, the damper 44 can include a first plate 54 and a second plate 56. In certain embodiments, the first plate 54 is attached to the pump 36, and the second plate 56 is coupled or attached to the clutch 46. More specifically, the first plate 54 can be coupled or attached to the casing 42, and specifically attached to the second casing portion 45 of the casing 42. In various embodiments, the first plate 54 is coupled or attached to the output shaft 16 of the engine 12, and the second plate 56 is coupled or attached to the clutch 46. In other embodiments, the first plate 54 is attached to the plate 40 of the engine 12. It is to be appreciated that the first and second plates 54, 56 can be attached to respective parts directly or indirectly. Furthermore, the first and second plates 54, 56 can be attached by any suitable methods, and non-limiting examples can include fasteners, welding, adhesive, couplers, clamps, etc. It is to be appreciated that the damper can include other components, and for example, the damper can include one or more springs.

Continuing with FIG. 3, the clutch 46 can include a first hub 58 and a second hub 60. In certain embodiments, the first hub 58 is coupled or attached to the second plate 56 of the damper 44, and the second hub 60 is coupled or attached to the turbine 38. In the vehicle application, the second hub 60 of the clutch 46 is coupled or attached to the input member 18 of the transmission 14. It is to be appreciated that the first and second hubs 58, 60 can be coupled to respective parts directly or indirectly, or can be attached to respective parts directly or indirectly. Furthermore, the first and second hubs 58, 60 can be attached by any suitable methods, and non-limiting examples can include fasteners, welding, adhesive, couplers, clamps, etc.

Again, continuing with FIG. 3, the turbine 38 can include a shell 62. The second hub 60 of the clutch 46 can be coupled or attached to the shell 62 of the turbine 38. Therefore, torque is transferred out of the torque converter assembly 32 through the shell 62 by the second hub 60 which is attached to the turbine 38. It is to be appreciated that the shell 62 can be attached to the second hub 60 directly or indirectly. Furthermore, the shell 62 can be attached by any suitable methods, and non-limiting examples can include fasteners, welding, adhesive, couplers, clamps, etc.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A torque converter assembly comprising:
a pump;
a turbine fluidly connected to the pump;
a damper operable upstream from the turbine and configured to reduce oscillation from the pump toward the turbine;
a clutch operable between the pump and the turbine, with the clutch operable in a slip condition in which the clutch is adjustable to allow the pump and the turbine to slip relative to each other to control oscillation through the clutch to the turbine;
wherein the damper is operable upstream from the clutch such that oscillation from the pump is reduced by the damper before oscillation reaches the clutch;
a casing that surrounds the turbine and the damper;
wherein:
the turbine is disposed between the pump and the clutch such that the turbine and the clutch align axially relative to each other;
the clutch and the damper align radially relative to each other such that the clutch and the damper are disposed next to the turbine;
the damper includes a first plate and a second plate, with the first plate directly attached to the casing;
the clutch includes a first hub and a second hub, with the second plate coupled to the clutch through the first hub and the second hub coupled to the turbine;
the first hub is separated from the second plate, and a fastener fixes the first hub and the second plate together; and
the first hub extends outwardly away from the fastener between the damper and the clutch.

2. The assembly as set forth in claim 1 wherein the turbine includes a shell, with the second hub of the clutch coupled to the shell of the turbine.

3. The assembly as set forth in claim 1 wherein the pump is rotatable to transfer torque through the damper and the clutch to the turbine when the clutch is operable in the slip condition, and wherein the damper is operable upstream from the clutch and the turbine relative to a direction that torque is transferred.

4. The assembly as set forth in claim 3 wherein the pump is operable upstream from the damper, the clutch and the turbine relative to the direction that torque is transferred, and wherein the damper is operable between the pump and the clutch relative to the direction that torque is transferred, and wherein the clutch is operable between the damper and the turbine relative to the direction that torque is transferred.

5. The assembly as set forth in claim 1 wherein the pump and the turbine are each rotatable, and wherein the pump and the turbine rotate at different speeds when the clutch is in the slip condition.

6. The assembly as set forth in claim 5 wherein the clutch is operable in a full lock condition in which the clutch locks the pump and the turbine together through the damper such that the pump and the turbine rotate at the same speed.

7. A vehicle comprising:
an engine including an output shaft;
a transmission including an input member;
a torque converter assembly operable between the output shaft and the input member, wherein the assembly comprises:
a pump;
a turbine fluidly connected to the pump;
a damper operable upstream from the turbine and configured to reduce oscillation from the pump toward the turbine;
a clutch operable between the pump and the turbine, with the clutch operable in a slip condition in which the clutch is adjustable to allow the pump and the turbine to slip relative to each other to control oscillation through the clutch to the turbine;
wherein the damper is operable upstream from the clutch such that oscillation from the pump is reduced by the damper before oscillation reaches the clutch;
a casing that surrounds the turbine and the damper; wherein:
the turbine is disposed between the pump and the clutch such that the turbine and the clutch align axially relative to each other;
the clutch is disposed between the damper and the input member such that the clutch and the damper align radially relative to the input member;
the damper includes a first plate and a second plate, with the first plate directly attached to the casing;
the clutch includes a first hub and a second hub, with the second plate coupled to the clutch through the first hub and the second hub coupled to the turbine;
the first hub is separated from the second plate, and a fastener fixes the first hub and the second plate together; and
the first hub extends outwardly away from the fastener between the damper and the clutch.

8. The vehicle as set forth in claim 7 wherein the first plate is coupled to the output shaft of the engine.

9. The vehicle as set forth in claim 7 wherein the second hub of the clutch is coupled to the input member of the transmission.

10. The vehicle as set forth in claim 7 wherein the turbine includes a shell, with the second hub of the clutch attached to the shell of the turbine.

11. The vehicle as set forth in claim 7 further including a plate fixed to the output shaft of the engine, with the casing fixed to the plate, and wherein the casing contains the pump, the turbine, the damper and the clutch.

12. The vehicle as set forth in claim 7 wherein the output shaft of the engine is rotatable to transfer torque in a direction to the input member of the transmission through the torque converter assembly, and wherein the damper is operable upstream from the clutch and the turbine relative to the direction that torque is transferred.

13. The vehicle as set forth in claim 12 wherein the pump is operable upstream from the damper, the clutch and the turbine relative to the direction that torque is transferred, and wherein the damper is operable between the pump and the clutch relative to the direction that torque is transferred, and wherein the clutch is operable between the damper and the turbine relative to the direction that torque is transferred.

14. The vehicle as set forth in claim 7 wherein the pump and the turbine are each rotatable, and wherein the pump and the turbine rotate at different speeds when the clutch is in the slip condition.

15. The vehicle as set forth in claim 14 wherein the clutch is operable in a full lock condition in which the clutch locks the pump and the turbine together through the damper such that the pump and the turbine rotate at the same speed.

\* \* \* \* \*